Jan. 4, 1944.  C. F. J. OVERHAGE  2,338,298
STEREOCINEMATOGRAPHY
Filed March 21, 1941
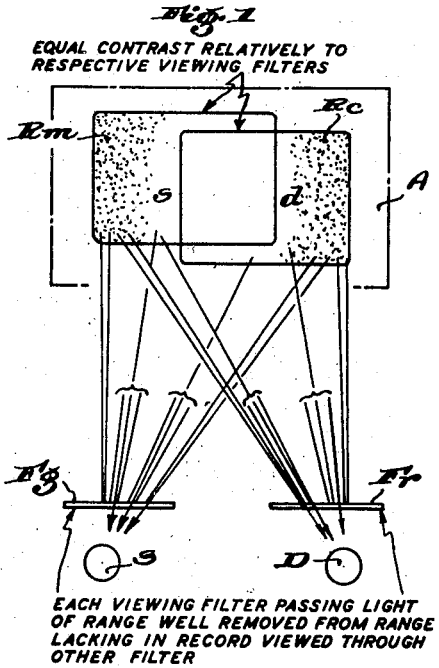
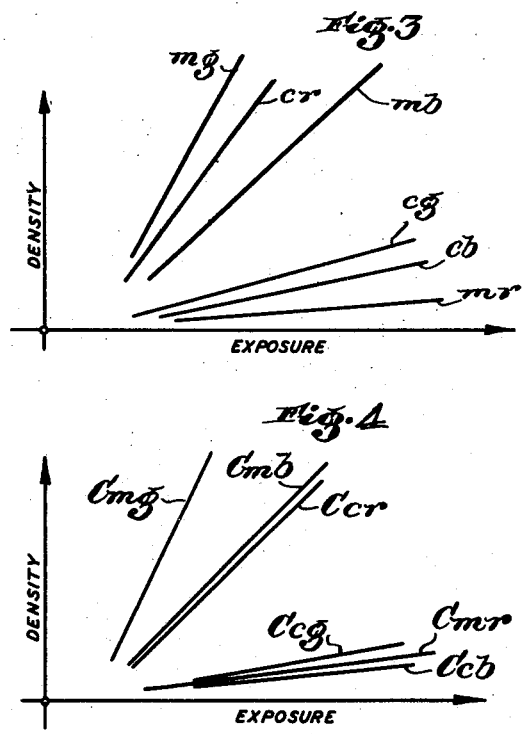
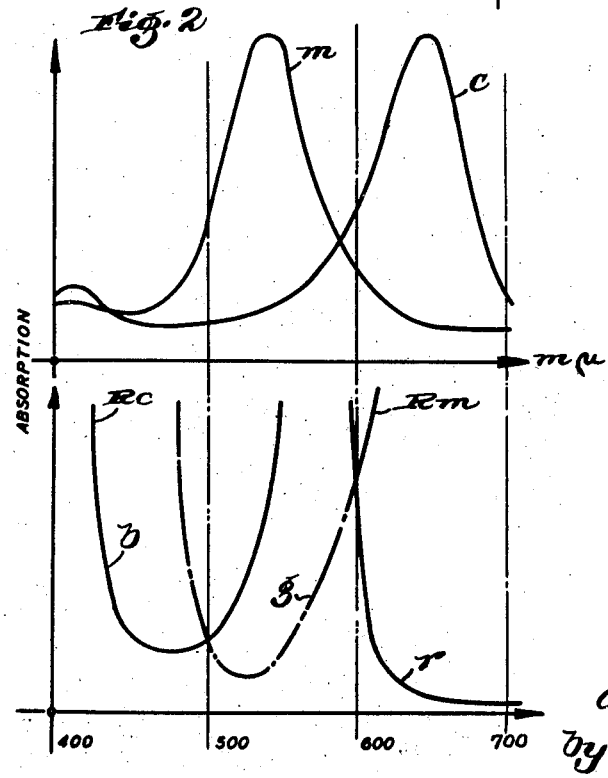

Patented Jan. 4, 1944

2,338,298

UNITED STATES PATENT OFFICE 2,338,298

STEREOCINEMATOGRAPHY

Carl F. J. Overhage, Hollywood, Calif., assignor to Technicolor Motion Picture Corporation, Hollywood, Calif., a corporation of Maine Application March 21, 1941, Serial No. 384,523

7 Claims. (Cl. 88—16.6)

The present invention deals with stereoscopic photography and more particularly with improvements in stereophotography of that type which employs superimposed stereoscopic records in colors, which records are viewed through filters suitably selected to present the respective records to different eyes of the observer.

Conventional arrangements of this type have the inherent disadvantage of permitting the viewing through one eye, to a certain degree, of the record which should only be visible to the other eye; since the two records are not in register, this results in disturbing so-called "ghost" images. Another defect, inherent especially in conventional stereocinematographic projection of this type, is unequal contrast of the images in the respective eyes. This defect appears to be a major cause of the visual fatigue experienced by many persons when viewing such records.

It is the main object of my invention to provide a method or system of stereoscopic representation of this type which is substantially free of ghost images and substantially eliminates fatigue due to unequal record contrast, to provide positive motion picture film with superimposed colored records which if projected and viewed through appropriate filters, offer these advantages, and to provide sets of viewing filters and colored records correlated in such manner that viewing of the records through the filters will substantially reduce ghost images and fatigue due to unequal image contrast.

These and other objects and aspects of my invention will be apparent from the following description of a specific embodiment thereof by way of explaining its genus, this description referring to a drawing in which Fig. 1 is a diagram illustrating a stereoscopic viewing system according to the invention;

Fig. 2 is a diagrammatical representation of the absorption characteristics of the records and viewing filters according to the invention;

Fig. 3 is a diagrammatical representation of the contrast characteristics of records according to the invention; and Fig. 4 is a diagrammatical representation similar to Fig. 3.

A stereoscopic system of the type in question will first be shortly described with reference to Fig. 1. Two superimposed differently colored records $s$ and $d$ are provided either for direct viewing or for viewing of their projected images. For example, record $s$ may be printed in magenta (minus green) dye on a transparent or opaque support, and record $d$ superimposed thereon in cyan (minus red) dye. The records, if on a transparent support, can be illuminated from behind and viewed directly through a green filter $Fg$ before the left eye S and a red filter $Fr$ before the right eye D, or the superimposed records may be projected with white light on a screen A and the images reflected from (or transmitted through) the screen, representing the two superimposed records, viewed through these filters.

It will be understood that in the following description the term "record" is intended to denote any representation differentiated as to the distribution of color density over its area, regardless whether originating directly from a record in material selectively transmitting or reflecting colored light or from an image projected from such a record. It will also be understood that spectral ranges are mentioned by way of example only and that other ranges, correlated according to similar principles, may be substituted.

Assuming that the previously mentioned spectral ranges are used, the blue and red light from record portions $Rm$ of picture $s$ will be absorbed by green transmitting filter $Fg$ before eye S which, however, transmits the green light coming from the other record $Rc$ as well as the green component of the white light from the non-record portions of both $s$ and $d$. Similarly, the red transmitting filter $Fr$ before the right eye D will absorb the blue and green light from cyan record $Rc$ and pass the red light from $Rm$ and the non-record portions of both $s$ and $d$. Hence, record $Rm$ will be visible in its various gradations of black to eye S, and similarly record $Rc$ to eye D, whereas the record portions $Rc$ and $Rm$ and both non-record portions will appear green to eye S and red to eye D, respectively, adding to a more or less neutral hue. These conditions are clearly indicated in Fig. 1.

The absorption ranges of practical record dyes (and hence the range of the light coming from record portions $Rm$ and $Rc$) are indicated in Fig. 2 where $m$ and $c$, respectively, represent the absorptions of magenta and cyan dyes plotted over the wave lengths.

Heretofore it was considered desirable to use complementary viewing filters, that is, filters whose transmission peaks lie substantially in the absorption peaks of the record dyes. The transmissions of such conventional filters are shown by curves $g$ and $r$ of Fig. 2. I have found, however, that this arrangement is undesirable because of the unavoidable overlap, especially in the central spectral region, of the record and filter absorption ranges. For example, the green viewing filter complementary to the magenta record and having characteristic $g$ will be quite satisfactory as far as absorption of the magenta record $m$ is concerned, but the density of the cyan record $c$ when viewed through filter $g$ is not sufficiently low, especially in the region from 550 to 600 m$\mu$. Therefore, such filters give rise to rather conspicuous ghost images originating in the absorption by the cyan record of light in the transmission range of the green filter. It will be evident that this defect is much less pronounced regarding the red filter and the magenta dye; indeed I found that the ghost originating in the absorption by the magenta record of light in the transmission range of the red filter is hardly noticeable.

According to one aspect of my invention, this disadvantage is largely eliminated by separating the filter transmission range well from the absorption range of the dye causing the ghost. In the present example, the filter transmission range will be moved towards the blue region, as indicated at $b$ of Fig. 2. This transmission range of a blue-green filter essentially coincides with the region of minimum density of the cyan dye so that the resulting effective density is very low. If the commercially most desirable cyan and magenta dyes are used, my new viewing filters introduce the collateral advantage that the color of the low density regions, as an additive combination of red and cyan, will be more nearly neutral than the combination of the conventional green and red.

Coming now to the contrast conditions prevailing in a system of this type, it will be apparent that a high effective contrast results from the combination of the red viewing filter and the cyan record for the right eye. On the other hand, the magenta record and the cyan filter are not as mutually exclusive as the cyan record and the red filter, and the left eye will therefore perceive an image of much lower contrast than the image seen by the right eye. It will be evident that similar contrast differences will be inherent in differing absorption characteristics of other conceivable combinations of colored records and corresponding viewing filters.

As mentioned above, it was known that the viewing of stereoscopic records in the general manner so far dealt with, causes visual fatigue, whereas the cause of this disadvantage was not known. This fatigue appears to be much reduced if the eyes are presented with images of approximately equal contrast, in the manner to be described.

It would seem that, in binocular vision, the observer's visual mechanism has to perform a function averaging the image intensities of corresponding elements of the respective monocular images. In normal vision, this averaging function is hardly very pronounced; at any rate the visual apparatus is not normally called upon to average and combine two density scales of different contrast, and it is plausible to assume that this visual fatigue is due to the effort necessary in performing the abnormal and unaccustomed contrast averaging.

Fig. 3 shows the contrast values of two records, again the commercially most desirable cyan and magenta dye records, as controlled in accordance with the invention. In order to simplify these diagrams, the ideal case of "straight-line" reproduction was assumed to prevail throughout, but it will be understood that the results will not be materially different for any other practical reproduction characteristic.

In Fig. 3, $cg$ and $cr$ are the contrast values of the cyan image as viewed through the conventional green and red filters, respectively, whereas $mg$ and $mr$ represent the contrast values of the magenta image as viewed through these filters. It will be noted that the contrast values $cr$ and $mg$ are fairly similar, but that $cg$ is rather high as compared to $mr$, indicating presence of the above-discussed ghost phenomenon.

As above described, the green viewing filter is replaced by a blue-green filter in order to avoid the ghost. If now, the contrasts of the magenta and cyan images are measured through the viewing filters, and not in the conventional way through the complementary filters, it appears that, as also indicated in Fig. 3, contrast $cb$ (cyan image related to blue-green viewing filter) becomes more favorable but contrast $mb$ decidedly unfavorable because quite different from value $cr$.

According to the invention, the printing process is so controlled (in ways well known per se and therefore not described herein) that, although the contrast as taken through the complementary filters may differ, the contrasts for the viewing filters become approximately equal. This control can be carried out either by establishing modified contrasts measured through standard complementary filters, or by directly establishing the desired contrasts through the appropriate viewing filters.

Fig. 4 shows the contrast values of a practical system compensated according to the principles of the invention. In this figure, $Cmg=2.15$ is the contrast of the magenta record through the complementary green filter, $Cmb=1.0$ is the contrast of the magenta record through the blue-green viewing filter according to the invention, $Cmr=0.12$ is the contrast of the magenta record through the complementary red filter which, in this embodiment, is also a satisfactory viewing filter, $Ccr=1.0$ is the contrast of the cyan record through the red filter, $Ccg=0.19$ the contrast of the cyan record through the green complementary filter, and $Ccb=0.14$ the contrast of the cyan record through the blue-green viewing filter. It will be noted that contrasts $Cmr$ and $Ccb$ are very low so that ghost images are eliminated, and that $Cmb$ and $Ccr$ as well as $Cmr$ and $Ccb$ have practically the same values, so that visual fatigue due to contrast discrepancy is avoided.

In this practical example, the records are made by imbibition printing according to well known methods, with standard cyan and magenta dyes, for example Patent Blue A (color index 714) and Violamine R (color index 758). The filters used are Wratten #29 for the red viewing and complementary filter, Wratten #61 for the green filter complementary to the magenta dye, and Wratten #45 for the cyan viewing filter.

As already mentioned, the invention can be applied to any other combination of record color ranges by analogously applying the principle of providing considerable gaps between filter transmissions and dye absorption bands while maintaining substantially equal record contrast values as referred to the viewing filters.

It will be understood that—although it is preferable to combine the ghost eliminating and fatigue-reducing features of the invention as above described—it is feasible on the one hand to shift filter transmission and record ranges to avoid ghost images while more or less neglecting the record contrasts or, on the other hand to equalize the record contrasts relatively to the respective viewing filters while paying less attention to the elimination of ghost images.

It should be understood that the present disclosure is for the purpose of illustration only and that this invention includes all modifications and equivalents which fall within the scope of the appended claims.

I claim:

1. In the art of presenting stereophotographic records to a viewer, the method which comprises providing for observation a record the pattern of which is formed through absorption of light of a selected spectral region and superimposed thereon a second record which is stereoscopically related to the first record and the pattern of which is formed through absorption of light of another spectral region which is substantially adjacent to said first region, and providing each eye of the viewer of said superimposed records with a light filter transmitting light coming from one of said records but substantially absorbing light transmitted by the other filter and light of a spectral region substantially separating the transmission ranges of said two filters, whereby more perfect separation of records of said adjacent absorption ranges is provided upon viewing them through said filters.

2. In the art of presenting stereophotographic records to a viewer, the method which comprises providing for observation a record the pattern of which is formed through absorption of light of a selected spectral region and superimposed thereon a second record which is stereoscopically related to the first record and the pattern of which is formed through absorption of light of another spectral region which is substantially adjacent to said first region, and providing the eyes of the viewer of said superimposed records with light filters substantially separating said records for visibility to different eyes, said records and filters together providing a stereoscopic image, said records having, if viewed through said filters, substantially the same contrast characteristics whereby visual fatigue may be substantially reduced.

3. In the art of presenting stereophotographic records to a viewer, the method which comprises providing for observation a record the pattern of which is formed through absorption of light of a selected spectral region and superimposed thereon a second record which is stereoscopically related to the first record and the pattern of which is formed through absorption of light of another spectral region which is substantially adjacent to said first region, providing each eye of the viewer of said superimposed records with a light filter transmitting light coming from one of said records but substantially absorbing light transmitted by the other filter and light of a spectral region substantially separating the transmission ranges of said two filters, and processing said records to provide, if viewed through said filters, substantially the same contrast characteristics whereby more perfect separation of records of said adjacent absorption ranges is provided and visual fatigue may be substantially reduced upon viewing them through said filters.

4. A stereoscopic picture comprising two superimposed records in coloring matter absorbing two different spectral regions respectively, said regions being selected for viewing through a given set of monocular viewing filters each of which transmits a spectral region well removed from the region absorbed by the record to be viewed through the other filter, the contrast values of said records relatively to their respective viewing filters being substantially equal.

5. A stereoscopic picture comprising a record in green absorbing, and a record in red absorbing coloring matter superimposed on said first record, said records being selected for viewing through a set of monocular viewing filters transmitting the blue green and red spectral regions, respectively, the contrast values of said records relatively to their respective viewing filters being substantially equal.

6. A set of superimposed stereoscopic records in color and a correlated pair of monocular viewing filters, said records absorbing light of two substantially adjacent spectral regions, one of said filters substantially absorbing the entire light range emitted by the first record and transmitting a light range emitted by the second record, the other filter absorbing a light range emitted by the second record and substantially separated from said emission range which is absorbed by said first filter and which other filter transmits a light range emitted by the first record, the contrast values of said records as viewed through the respective viewing filters being substantially equal.

7. A set of two superimposed steroscopic records in green absorbing and red absorbing dyes, respectively, and a correlated pair of blue green transmitting and red transmitting, respectively, viewing filters, the contrast values of said records relatively to their respective viewing filters being substantially equal.

CARL F. J. OVERHAGE.